(12) United States Patent
Cook (10) Patent No.: US 8,888,144 B2
(45) Date of Patent: Nov. 18, 2014

(54) MISALIGNMENT CONNECTOR UTILIZING INTERLEAVED BEARINGS

(75) Inventor: Bryan D. Cook, Eccleston (GB)

(73) Assignee: Taper-Lok Corporation, Houston, TX (US)

( * ) Notice: Subject to any disclaimer, the term of this patent is extended or adjusted under 35 U.S.C. 154(b) by 434 days.

(21) Appl. No.: 13/286,960

(22) Filed: Nov. 1, 2011

(65) Prior Publication Data

US 2013/0106093 A1    May 2, 2013

(51) Int. Cl.
| F16L 23/032 | (2006.01) |
| F16L 23/12 | (2006.01) |
| F16C 19/10 | (2006.01) |
| F16C 19/54 | (2006.01) |
| F16L 49/04 | (2006.01) |

(52) U.S. Cl.
CPC ...................... *F16L 49/04* (2013.01)
USPC ........... 285/364; 285/184; 285/276; 285/406; 285/414; 384/447; 384/521; 384/609; 384/613

(58) Field of Classification Search
CPC ................................ F16L 23/006; F16L 23/12
USPC ......... 285/276, 277, 364, 367, 368, 406, 414, 285/415, 184; 384/447, 521, 609, 613
See application file for complete search history.

(56) References Cited

U.S. PATENT DOCUMENTS

| 816,155 | A | * | 3/1906 | Dean ........................... 285/334.4 |
| 1,443,115 | A | * | 1/1923 | Breese ........................... 384/521 |
| 2,833,568 | A | * | 5/1958 | Corsette ........................ 285/281 |
| 2,967,069 | A | * | 1/1961 | Holmes ......................... 285/399 |
| 3,451,698 | A | | 6/1969 | Charkoff |
| 3,677,580 | A | | 7/1972 | Klanke |
| 3,891,246 | A | | 6/1975 | Hopper |
| 4,225,160 | A | * | 9/1980 | Ortloff ........................ 285/123.2 |
| 4,303,262 | A | | 12/1981 | Pierrel |
| 4,696,494 | A | * | 9/1987 | Schmitz et al. ................. 285/18 |
| 4,840,409 | A | | 6/1989 | Welkey |
| 5,127,681 | A | | 7/1992 | Thelen |
| 2007/0080535 | A1 | | 4/2007 | Howard |
| 2008/0166082 | A1 | * | 7/2008 | Hofmann et al. ............. 384/613 |

FOREIGN PATENT DOCUMENTS

GB          314895 A * 8/1930 ............... B30B 1/00

* cited by examiner

*Primary Examiner* — James Hewitt
(74) *Attorney, Agent, or Firm* — Law Offices of Mark L. Berrier (57) ABSTRACT

Systems and methods for connecting misaligned pipe sections, where two sets of variably spaced bearings enable the transfer of evenly distributed pressure from a collar member to a coupling member. One embodiment comprises a misalignment coupling that includes first and second coupling members, a collar, and two sets of bearings. The collar is positioned around the second coupling member and has a flange for coupling to a flange of the first coupling member. The bearings are positioned in an annular space between the second coupling member and the collar. The two sets of bearings have variable spacing and are interleaved, with one set contacting the collar and one set contacting the second coupling member. When the flanges are secured to each other, contact pressure is transferred from the collar through the bearings to the second coupling member, thereby applying contact pressure between the first and second coupling members.

15 Claims, 5 Drawing Sheets

MISALIGNMENT CONNECTOR UTILIZING INTERLEAVED BEARINGS

BACKGROUND

1. Field of the Invention

The invention relates to systems and methods for connecting pipes, and more particularly to systems and methods for connecting pipe sections that are axially/angularly misaligned, where two sets of spaced bearings in a coupling assembly enable the transfer of evenly distributed pressure from a collar member to a coupling member, even when the collar member and coupling member are not aligned.

2. Related Art

The use of pipelines for handling large volumes of fluids is widely known. High-volume pipelines are commonly used to transport fluid hydrocarbons such as oil. The pipelines used in these applications typically consist of a number of pipe sections which are connected end-to-end to form a single conduit. In theory, adjoining pipe sections are axially aligned so that they can be connected by means of standard flanges that are welded to the ends of the pipe sections. The flanges are then bolted together to couple the pipe sections together. In reality, however, adjoining pipe sections may be misaligned, so that a standard bolted-flange connection cannot form a seal or cannot be made at all. For example, in subsea environments, it may not be possible to keep the pipe sections aligned when they are laid, and they may become misaligned due to environmental forces or repairs on the pipeline.

In many instances, pipelines carry fluids that may be toxic, volatile, corrosive or otherwise dangerous. Often, it is necessary to pressurize the fluids that are carried by the pipelines. Because it may be potentially dangerous for fluids to escape from the pipelines, it is very important to ensure that the connections between pipe sections in the pipelines do not leak. The integrity of the seal between two pipe sections in a pipeline depends on a number of factors, including the type of connection between the pipe sections, the type of gaskets or seals used in the connection, and even the manner in which the connection is assembled.

It is important in the assembly of connections between pipe sections to ensure that the load on the sealing surfaces is evenly distributed. If the distribution is uneven, less pressure may be applied on one side of the sealing surfaces, causing the connection to leak. This may be even more of a problem in connections that are designed to accommodate misalignment between the flanges. It would therefore be desirable to provide systems and methods that assist in the even distribution of the load on the connection's sealing surfaces.

SUMMARY OF THE INVENTION

This disclosure is directed to systems and methods for connecting misaligned pipe sections that solve one or more of the problems discussed above. In one particular embodiment, a misalignment coupling for connecting conduit sections includes first and second coupling members, a collar, and a plurality of bearings (e.g., ball bearings). The first coupling member has a rearward end which is configured to be connected to a conduit section, a forward end configured to mate with the second coupling member, and a flange at its periphery. The second coupling member also has a rearward end which is configured to be connected to a conduit section and a forward end which is complementary to the forward end of the first coupling member. The second coupling member also has a rearward-facing shoulder. The collar is configured to be positioned around the second coupling member. The collar has a flange at its periphery which is configured to be secured to the flange of the first coupling member. The bearings are positioned in a generally annular space between the shoulder of the second coupling member and a forward-facing rear portion of the collar. The bearings include a first set and a second set, where the bearings of the first and second sets are interleaved and spaced such that each bearing of one set is angularly positioned between and in contact with two adjacent bearings of the other set. When the collar and first coupling member flanges are secured to each other, contact pressure is transferred from the forward-facing rear portion of the collar to the first set of bearings, from the first set of bearings to the second set of bearings, and from the second set of bearings to the shoulder of the second coupling member. The spacing between successive bearings of each set is variable, such that the shoulder of the second coupling member and the forward-facing rear portion of the collar member can be alternately parallel and non-parallel.

The first coupling member may be a female coupling member and the second coupling member may be a male coupling member. The misalignment coupling may include a seal ring which is positioned between the female coupling member and the male coupling member. The flange of the collar may be, for example, clamped or bolted to the flange of the first coupling member. The misalignment coupling may include stops that are connected to the second coupling member to retain the collar in position around the coupling member. The stops may also limit the misalignment of the second coupling member with the collar. The shoulder of the second coupling member and the forward-facing rear portion of the collar may each have a corresponding race (e.g., a groove) in which the bearings are positioned.

Another embodiment comprises a method for connecting two pipe sections that may be misaligned. The method includes providing first and second coupling members, where the first coupling member is connected to the end of a first pipe section and the second coupling member is connected to the end of a second pipe section. The first coupling member has a first flange at its periphery. The second coupling member has a rearward-facing shoulder and a collar positioned around the second coupling member adjacent to the shoulder of the second coupling member. The collar has a second flange which is configured to be secured to the first flange. A plurality of bearings are positioned in a generally annular space between the shoulder and a forward-facing rear portion of the collar. The bearings include first and second sets that are interleaved and spaced such that each bearing of one set is angularly positioned between and in contact with two adjacent bearings of the other set, wherein the spacing between successive bearings of each set is variable. The method further includes securing (e.g., clamping or bolting) the second flange to the first flange, thereby transferring pressure from the forward-facing rear portion of the collar member to the first set of bearings, from the first set of bearings to the second set of bearings, and from the second set of bearings to the shoulder of the second coupling member. This secures the first coupling member to the second coupling member.

Yet another alternative embodiment comprises a method for transferring force between surfaces that may be misaligned. The method includes providing first and second surfaces which may be either parallel or misaligned (non-parallel). A plurality of bearings are positioned in a generally annular space between the first and second surfaces. The plurality of bearings consist of a first set and a second set, where the bearings of the first and second sets are interleaved and spaced such that each bearing of one set is angularly positioned between and in contact with two adjacent bearings of the other set, and where the bearings of the first set are in contact with the first surface and the bearings of the second set are in contact with the second surface. A force is then applied to the first surface and is transferred from the first surface to the first set of bearings, from the first set of bearings to the second set of bearings, and from the second set of bearings to the second surface, whether the surfaces are aligned or misaligned.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for connecting sections of pipe or other conduit that are misaligned. The present systems and methods employ two sets of spaced bearings in a coupling assembly, where the bearings are positioned between a first coupling member and a collar that is positioned around the first coupling member. The collar is secured to a second coupling member, and force is applied by the collar, through the bearings, to the first coupling member to provide contact pressure between the sealing surfaces of the first and second coupling members.

The bearings form two sets. A first set is in contact with the first coupling member, and a second set is in contact with the collar. The bearings are positioned in a generally annular space (a ring) between the first coupling member and the collar. The bearings of the two sets are interleaved, and are spaced so that each bearing is in contact with two adjacent bearings of the other set. When the collar is misaligned with respect to the first coupling member (corresponding to misalignment of the first and second coupling members), the bearings of each set move closer together on one side and further apart on the opposite side, allowing the two sets of bearings to maintain contact between the first coupling member and the collar. Consequently, contact pressure is maintained between the first coupling member and the collar, hence between the first coupling member and the second coupling member.

Figure 1:
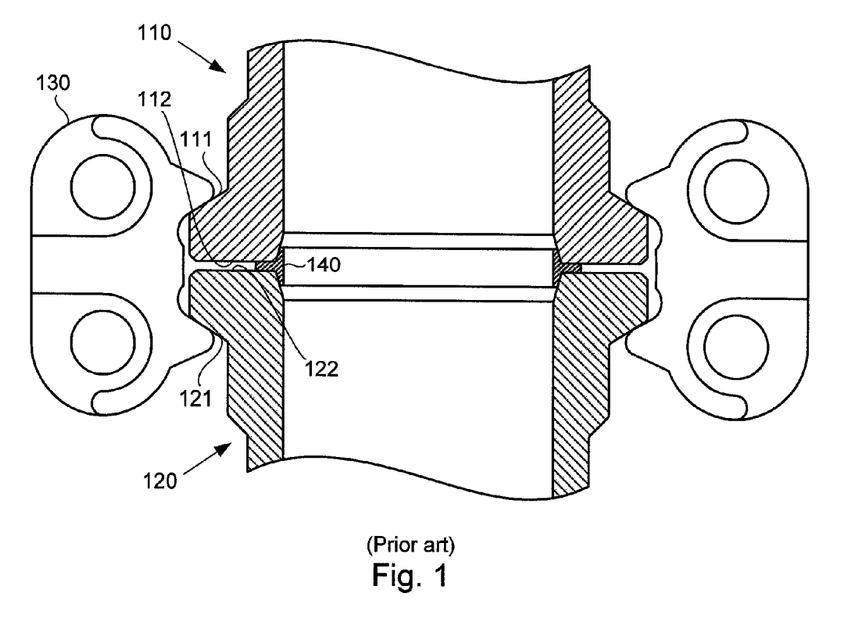
FIG. 1 is a diagram illustrating a pipe connection in accordance with the prior art.

Referring to FIG. 1, a diagram illustrating a pipe connection in accordance with the prior art is shown. This connection includes a first coupling member 110 and a second coupling member 120. Each of the coupling members is welded to the end of a corresponding pipe section (not shown in the figure). Each coupling member has a flange (111, 121) around its periphery. A clamshell-type clamp 130 is used to clamp flanges 111 and 121 together, thereby securing the coupling members and corresponding pipe sections to each other. A gasket or seal ring 140 having a T-shaped cross-section is positioned between the faces of coupling members 110 and 120 to seal the connection and prevent fluid from leaking out of the connection.

While the coupling members are commonly referred to as flanges, the term "flange" as used in this disclosure will refer to the portion of a coupling member that extends radially outward from the coupling member so that it can be secured to, for example, the flange of another coupling member. In the connection of FIG. 1, the flanges are clamped together, but they may alternatively be bolted together or secured by other means.

The connection of FIG. 1 is a simple connection that uses two identical coupling members. Each of the coupling members has a flat face (112, 122). Seal ring 140 is compressed between the faces of the coupling members to provide a seal between them. If the faces of the coupling members are not parallel (i.e., if the pipe sections to which they are attached are not aligned), the seal ring will not be evenly compressed, and the connection is likely to leak at the point at which the contact pressure between the seal ring and the faces of the coupling members is lowest.

If it is anticipated that the pipe sections may be misaligned, the connection between the pipe sections should be designed to enable the coupling of the pipe sections in a manner that maintains the seal integrity between them. Embodiments of the present invention enable the coupling of misaligned pipe sections while providing an even distribution of contact pressure around the sealing faces of the coupling members.

Figure 2:
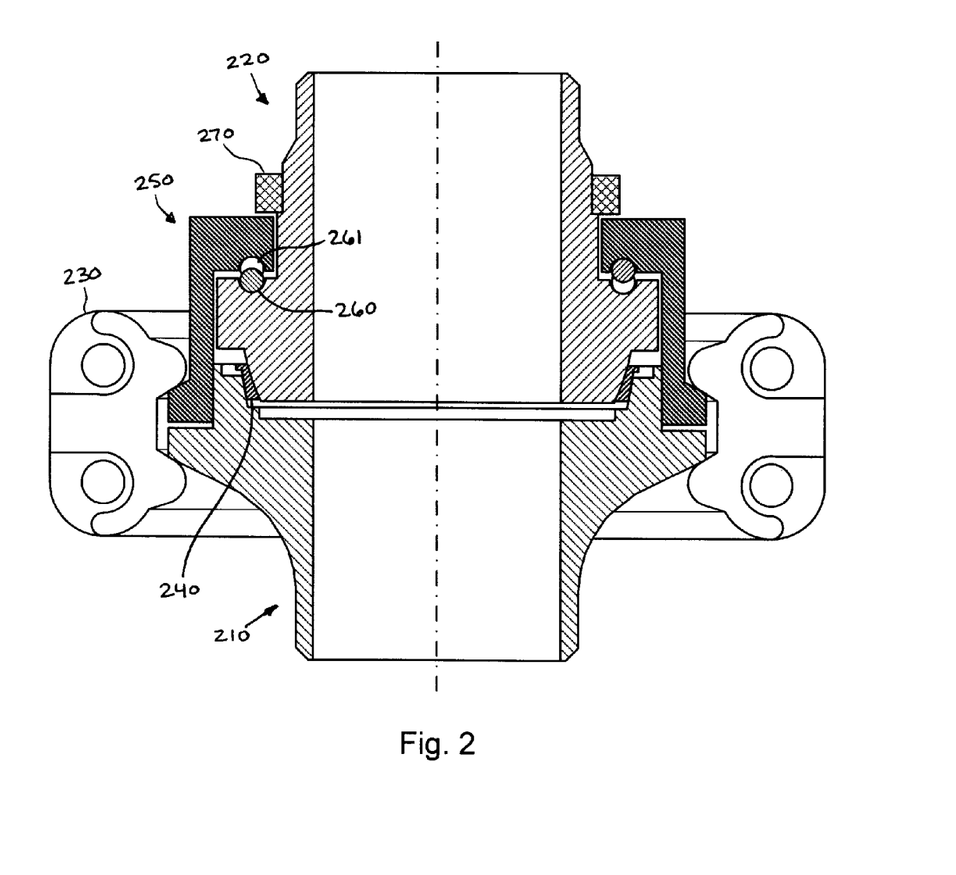
FIG. 2 is a diagram illustrating cross-sectional view of an exemplary embodiment of a misalignment connection in accordance with one embodiment.
Figure 3:
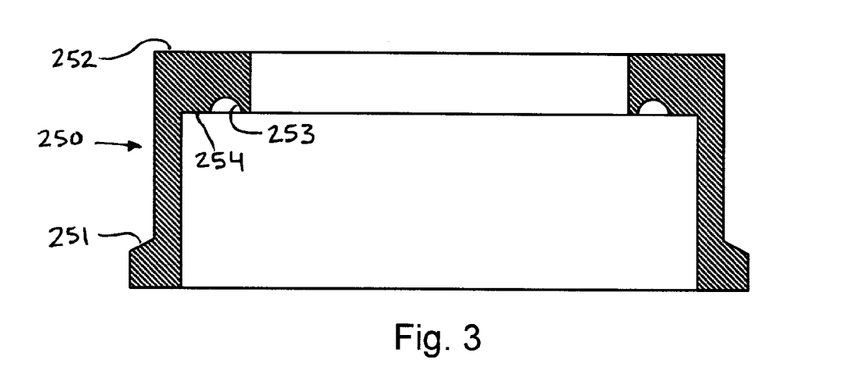
FIG. 3 is a cross-sectional view of a collar component of the misalignment connection of FIG. 2.
Figure 4:
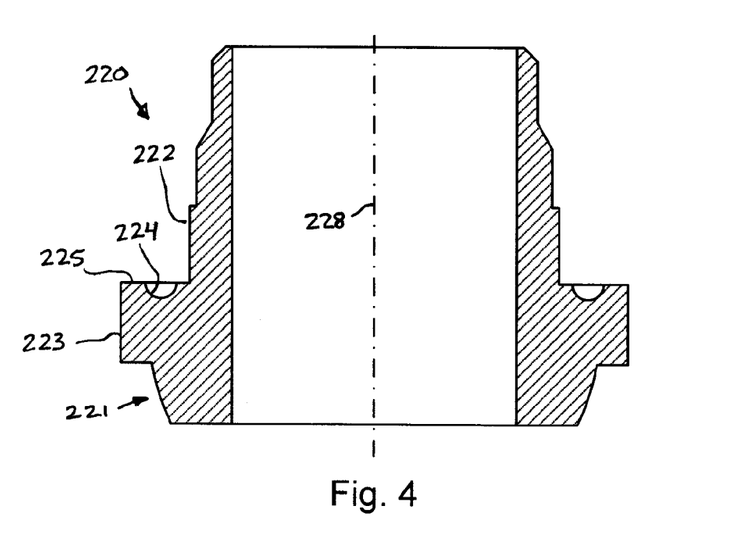
FIG. 4 is a cross-sectional view of a male coupling member component of the misalignment connection of FIG. 2.
Figure 5:
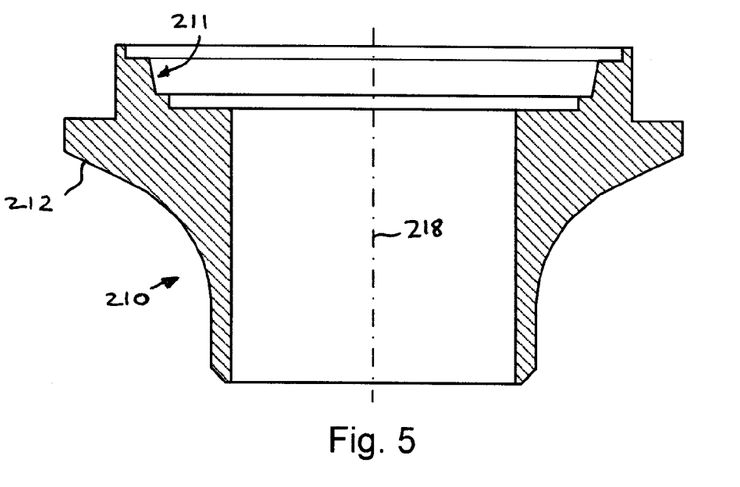
FIG. 5 is a cross-sectional view of a female coupling member component of the misalignment connection of FIG. 2.

Referring to FIGS. 2-5, an exemplary embodiment of a misalignment connection in accordance with one embodiment is shown. FIG. 2 is a cross-sectional view of the assembled connection. FIG. 3 is a cross-sectional view of a collar component. FIG. 4 is a cross-sectional view of a male coupling member component. FIG. 5 is a cross-sectional view of a female coupling member component.

In the embodiment of FIGS. 2-5, two coupling members (210, 220) are provided, but they are not identical as in the prior art connection. Instead. coupling member 210 is a female member, while coupling member 220 is a male member. Female coupling member 210 has a socket portion 211 which is sized to accommodate a nose portion 221 male coupling member 220. A seal ring 240 is positioned between nose portion 221 and socket portion 211 to provide a seal when the male and female coupling members are mated. It can be seen from the figures that the outer surface of seal ring 240 and the corresponding seat for the seal ring within socket 211 have a tapered surface (a conic section). The inner surface of seal ring 240 and the corresponding surface of nose portion 221 are spherical. This allows nose portion 221 to maintain sealing contact with seal ring 240 while the seal ring remains seated against socket 211.

It should also be noted that the cross-section of seal ring 240 is tapered, with the larger end of the taper closer to the interior of the connection. This configuration is designed for applications in which the fluid within the pipeline is pressurized. The higher pressure within the interior of the connection causes seal when 240 to be wedged more tightly into the gap between socket portion 211 and nose portion 221. In applications in which the exterior pressure is greater than the interior pressure, the connection can be designed to utilize a tapered seal ring, wherein the larger end of the taper faces the exterior of the connection. Other types of seal rings or gaskets may also be used in alternative embodiments.

A collar 250 is positioned around a neck portion 222 of the male coupling member. Collar 250 has a flange portion 251. Flange portion 251 of the collar is configured to be secured to a similar flange portion 212 the female coupling member. Flange portions 251 and 212 are held together in this embodiment by a clamshell-type clamp 230. Collar 250 also has a rear portion 252 which is configured to retain a shoulder portion 223 of the male coupling member. Rear portion 252 of collar 250 does not directly contact shoulder 223, but instead uses a plurality of ball bearings (e.g., 260, 261) to transfer force from rear portion 252 to shoulder 223. The configuration and action of the bearings will be explained in more detail below. In this embodiment, a race 253 is formed in a forward facing surface 254 of rear portion 252. A similar race 224 is formed in a rearward facing surface 225 of shoulder 223. Races 253 and 224 serve to keep the bearings within an annular space between rear portion 252 of collar 250 and shoulder 223 of male coupling member 220. In this embodiment, the races are simple grooves in the respective component surfaces, but they could have different configurations, particularly if bearings other than ball bearings are used.

It should be noted that terms such as "forward", "rearward" and the like are relative to the interface between the male and female coupling members. For example, the rear portion 252 of collar 250 is the portion farthest from the coupling member interface, and the forward facing surface 254 of rear portion 252 is the surface that faces the interface. The "forward" and "rear" directions are the same for collar 250 and male coupling member 220. The "forward" and "rear" directions for female coupling member 210 are opposite those of collar 250 and male coupling member 220.

Figure 6A:
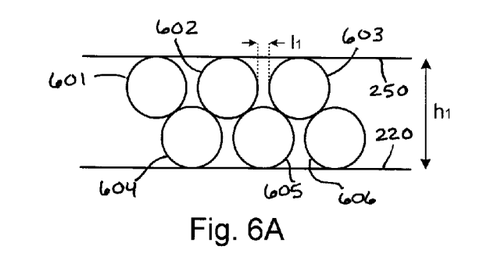
FIGS. 6-8 are diagrams illustrating the changes in height and length of a series of interleaved ball bearings as the spacing of the bearings changes.
Figure 6B:
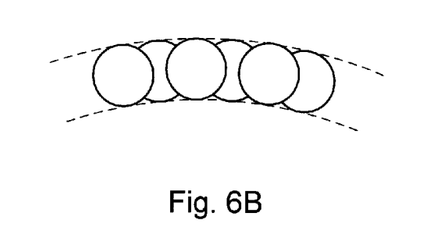
Figure 7A:
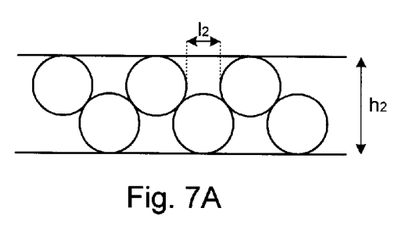
Figure 7B:
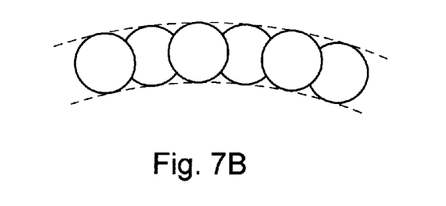
Figure 8A:
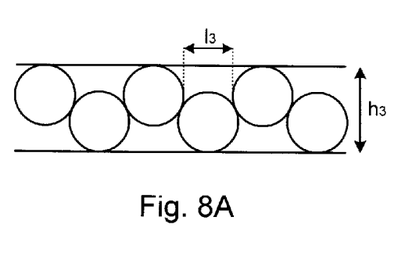
Figure 8B:
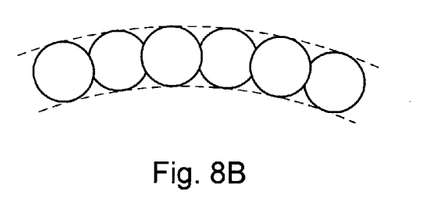
Figure 9A:
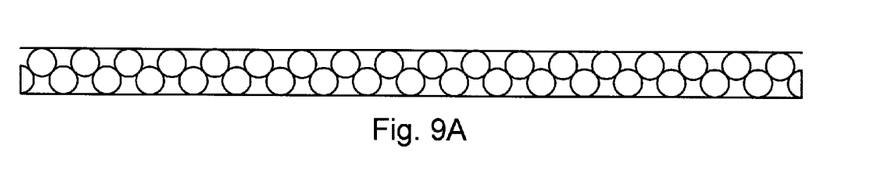
FIGS. 9A and 9B are diagrams illustrating the spacing of bearings in an exemplary embodiment when the coupling members are aligned or misaligned.
Figure 9B:
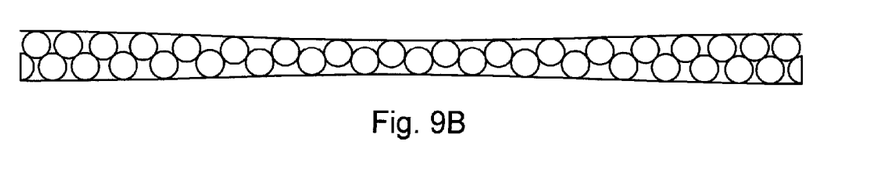

As noted above, ball bearings are used to transfer force from collar 250 to male coupling member 220. FIGS. 6-9 are provided to illustrate the manner in which this is accomplished. FIGS. 6-8 are diagrams illustrating the changes in height and length of a series of interleaved ball bearings as the spacing of the bearings changes. FIGS. 9A and 9B are diagrams illustrating the spacing of the bearings when the coupling members are aligned or misaligned.

In the embodiment of FIGS. 2-5, the ball bearings comprise two sets. One of the sets is in contact with collar 250, while the other set is in contact with male coupling member 220. The two sets of bearings are interleaved, so that each bearing is in contact with two adjacent bearings of the other set, as well as either the collar or the male coupling member. For instance, referring to FIG. 6A (which is a view of the bearings looking toward the axis of the collar), bearings 601-603 may be in the first set, while bearings 604-606 may be in the second set. Each of the bearings in the first set (e.g., 602) is in contact with collar 250 and two adjacent bearings of the second set (e.g., 604, 605). Each of the bearings in the second set (e.g., 605) is in contact with male coupling member 220, as well as two adjacent bearings of the first set (e.g., 602, 603).

FIG. 6B is a top view of the bearings (the view parallel to the axis of the collar). FIG. 6B shows the same spacing between bearings as in FIG. 6A. FIG. 6B also shows the curvature of the races (224, 253) in which the bearings are contained. Races 224 and 253 and each of the ball bearings within the races are equidistant from the axis of the respective component. In other words, race 224 and the bearings therein are at the same distance from the axis of male coupling component 220 as are race 253 and the bearings therein from the axis of collar 250. FIGS. 7A and 8A are side views of the bearings with different heights and spacings in comparison to FIG. 6A. FIGS. 7B and 8B are top views corresponding to FIGS. 7A and 8A, respectively. It can be seen from these figures that, as the spacing between successive bearings of each set increases, the combined height of the two sets of bearings decreases.

When collar 250 and male coupling member 220 are aligned, surfaces 225 and 254 are parallel. Consequently, the height of the annular space in which the ball bearings are positioned is constant. The bearings are therefore evenly spaced as shown in FIG. 9A. It should be noted that, for the purpose of clarity, FIGS. 9A and 9B show the angular positions of the bearings around the connection as linear positions.

When collar 250 and male coupling member 220 are misaligned, surfaces 225 and 254 are not parallel, so the height of the annular space varies in a sinusoidal fashion, as shown in FIG. 9B. The bearings accommodate this by shifting their positions. Where the height of the annular space is slightly decreased, the spacing between the bearings is increased. Where the height of the annular space is slightly increased, the spacing between the bearings is decreased. As shown in FIG. 9B, the resulting spacing of the bearings varies from one point to another in the annular space. With this spacing, the bearings of the two sets define non-parallel planes. The first of the planes is parallel to surface 225, while the other is parallel to surface 254.

Figure 10:
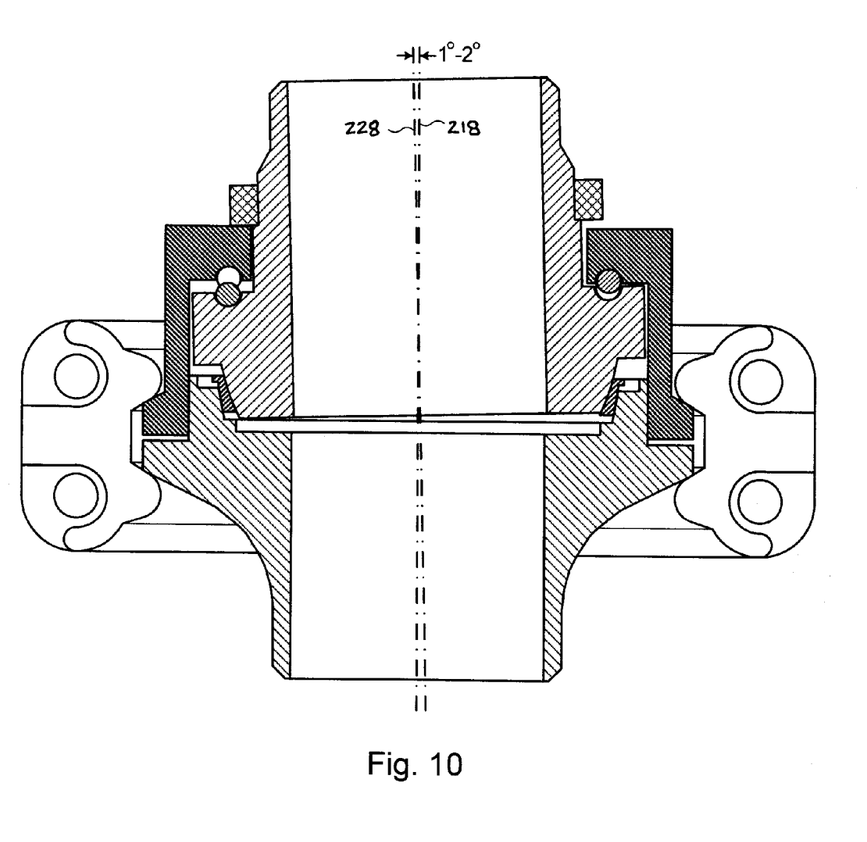
FIG. 10 is a diagram illustrating cross-sectional view of the embodiment of FIG. 2 when the male and female coupling members of the misalignment connection are misaligned.

Referring to FIG. 10, the connection of FIGS. 2-5 is shown in a misaligned position. It can be seen that the axes of the female coupling member and male coupling member (218 and 228, respectively) are misaligned by a small amount (between one and two degrees). Collar 250 in this case remains aligned with female coupling member 210. It can also be seen in the figure that the height of the annular space between collar 250 and male coupling member 220 is greater on the left side of the figure than on the right side. The bearings will therefore be more closely spaced on the left side and farther apart on the right side. Referring again to FIG. 9B, the center of the figure would correspond to the right side of FIG. 10, while the left and right edges of FIG. 9B would correspond to the left side of FIG. 10.

The misalignment of the coupling members is limited by the particular design of the components. In the embodiment of FIGS. 2-5 and 10, stops 270 are provided to limit the misalignment. When stop 270 contacts the top of collar rear portion 252, further misalignment is impeded. Misalignment may also be limited by contact between the neck of male coupling member 220 and the inner diameter of collar rear portion 252. Stops 270 also serve in this embodiment to prevent collar 250 from being removed from its position around the neck of male coupling member 220 and limits the maximum distance between surfaces 225 and 254. This prevents the bearings from having sufficient space to move out of their respective interleaved positions.

It should be noted that some of the terms used in this disclosure are preceded by the descriptors "generally" or "substantially". These descriptors are used to indicate that a term which is preceded by one of these descriptors is intended to be construed broadly. For instance, the "generally annular space" referred to above is intended to include shapes that encompass the interleaved bearings between the collar and male coupling member, even if the shapes do not fall within a strict (e.g., mathematical) definition of an annulus.

The exemplary embodiment of the misalignment connection as described above is one of many possible embodiments. Alternative embodiments may have variations on the features described above. For example, although the foregoing embodiment uses a clamshell clamp to secure the collar to the female coupling member, other embodiments may use bolted flanges, different types of clamps, or other fastening means. Alternative embodiments may also use gaskets, o-rings, seal rings or sealing means other than the tapered seal ring described above. Similarly, type of bearings used in a particular embodiment may have any diameter, hardness, material, shape or other characteristic that is suitable for the design and application of that embodiment.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A misalignment coupling for connecting conduit sections comprising:
   a first coupling member having an aperture therethrough, wherein the first coupling member includes
      a first rearward end which is configured to be connected to a first conduit section,
      a first forward end, and
      a first flange at the periphery of the first coupling member;
   a second coupling member having an aperture therethrough, wherein the second coupling member includes
      a second rearward end which is configured to be connected to a second conduit section,
      a second forward end which is complementary to the first forward end of the first coupling member, and
      a rearward-facing shoulder;
   a collar member
      wherein the collar member is configured to be positioned around the second coupling member, and
      wherein the collar member has a second flange at the periphery of the collar member, wherein the second flange is configured to be secured to the first flange;
   a plurality of bearings
      wherein the plurality of bearings are positioned in a generally annular space between the shoulder of the second coupling member and a forward-facing rear portion of the collar member,
      wherein the plurality of bearings comprise a first set of the bearings and a second set of the bearings, wherein each of the bearings in the plurality of bearings belongs to either the first set or the second set, wherein the bearings of the first and second sets are interleaved and spaced such that each bearing of one set is angularly positioned between and in contact with two adjacent bearings of the other set,
      wherein contact pressure applied by a securing component to the collar is transferred from the forward-facing rear portion of the collar member to the first set of bearings, from the first set of bearings to the second set of bearings, and from the second set of bearings to the shoulder of the second coupling member, and
      wherein the spacing between successive bearings of each set is variable, such that the shoulder of the second coupling member and the forward-facing rear portion of the collar member can be alternately parallel and non-parallel.

2. The misalignment coupling of claim 1, wherein the shoulder of the second coupling member and the forward-facing rear portion of the collar member each has a corresponding race, wherein the bearings of one set are positioned in the race in the shoulder of the second coupling member and the bearings of the other set are positioned in the race in the forward-facing rear portion of the collar member.

3. The misalignment coupling of claim 2, wherein each race comprises a groove.

4. The misalignment coupling of claim 1, wherein the first coupling member comprises a female coupling member and the second coupling member comprises a male coupling member, and wherein the female coupling member is configured to mate with the male coupling member.

5. The misalignment coupling of claim 4, further comprising a seal ring positioned between the female coupling member and the male coupling member.

6. The misalignment coupling of claim 1, wherein the bearings comprise ball bearings.

7. The misalignment coupling of claim 1, wherein the collar member is clamped by the securing component to the first coupling member.

8. The misalignment coupling of claim 1, wherein the collar member is bolted by the securing component to the first coupling member.

9. The misalignment coupling of claim 1, further comprising one or more stops connected to the second coupling member, wherein the stops retain the collar member in position around the second coupling member.

10. The misalignment coupling of claim 9, wherein the one or more stops limit the misalignment of the second coupling member with the collar member.

11. A method for connecting two pipe sections that may be misaligned, the method comprising:
   providing a first coupling member connected to an end of a first pipe section, wherein the first coupling member has a first aperture therethrough and includes a first forward end, and a first flange at the periphery of the first coupling member;

providing a second coupling member connected to an end of a first pipe section, wherein the second coupling member has a second aperture therethrough and includes a second forward end which is complementary to the first forward end of the first coupling member, a rearward-facing shoulder, a collar positioned around the second coupling member, wherein the collar member has a second flange which is configured to be secured to the first flange, and a plurality of bearings, wherein the bearings are positioned in a generally annular space between the shoulder and a forward-facing rear portion of the collar, wherein the bearings include a first set and a second set, wherein each of the bearings in the plurality of bearings belongs to either the first set or the second set, wherein the first and second sets are interleaved and spaced such that each bearing of one set is angularly positioned between and in contact with two adjacent bearings of the other set, wherein the spacing between successive bearings of each set is variable; and securing the second flange to the first flange, thereby transferring pressure from the forward-facing rear portion of the collar member to the first set of bearings, from the first set of bearings to the second set of bearings, and from the second set of bearings to the shoulder of the second coupling member, thereby securing the first coupling member to the second coupling member.

12. The method of claim 11, further comprising placing the pipe sections in angularly misaligned relation prior to securing the second flange to the first flange.

13. The method of claim 11, wherein securing the second flange to the first flange comprises clamping the second flange to the first flange.

14. The method of claim 11, wherein securing the second flange to the first flange comprises bolting the second flange to the first flange.

15. The method of claim 11, further comprising positioning a seal ring between the first forward end and the second forward end prior to securing the second flange to the first flange.

\* \* \* \* \*